(12) United States Patent
Nishio et al.

(10) Patent No.: US 6,733,340 B2
(45) Date of Patent: May 11, 2004

(54) CONNECTOR FOR MEMORY CARD (75) Inventors: Atsushi Nishio, Mito (JP); Takashi Kawasaki, Mito (JP); Isao Suzuki, Mito (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/223,548

(22) Filed: Aug. 19, 2002

(65) Prior Publication Data
US 2003/0045168 A1 Mar. 6, 2003

(30) Foreign Application Priority Data
Aug. 31, 2001 (JP) ...................................... 2001-263545

(51) Int. Cl.[7] .............................................. H01R 24/00
(52) U.S. Cl. ........................ 439/630; 439/159; 439/79; 235/451
(58) Field of Search ............................ 439/630, 79–80, 439/159; 235/451, 441

(56) References Cited

U.S. PATENT DOCUMENTS

| 3,596,235 | A | * | 7/1971 | Teurlings | 439/748 |
| 4,136,917 | A | * | 1/1979 | Then et al. | 439/326 |
| 4,701,002 | A | * | 10/1987 | Mouissie | 439/426 |
| 4,826,446 | A | * | 5/1989 | Juntwait | 439/326 |
| 4,946,403 | A | * | 8/1990 | Billman et al. | 439/326 |
| 5,158,471 | A | * | 10/1992 | Fedder et al. | 439/80 |
| 5,238,414 | A | * | 8/1993 | Yaegashi et al. | 439/108 |
| 5,259,768 | A | * | 11/1993 | Brunker et al. | 439/60 |
| 5,387,112 | A | * | 2/1995 | Chishima | 439/67 |
| 5,474,468 | A | * | 12/1995 | Chishima et al. | 436/495 |
| 5,580,267 | A | * | 12/1996 | Stipanuk et al. | 439/326 |
| 5,702,271 | A | * | 12/1997 | Steinman | 439/676 |
| 5,709,568 | A |   | 1/1998 | Pan et al. |  |
| 5,860,825 | A | * | 1/1999 | Yodogawa | 439/326 |
| 5,984,708 | A | * | 11/1999 | Yu | 439/326 |
| 6,293,464 | B1 | * | 9/2001 | Smalley, Jr. | 235/451 |
| 6,312,268 | B1 | * | 11/2001 | Chih-Kai | 439/108 |

FOREIGN PATENT DOCUMENTS

| EP | 0950975 | 10/1999 |
| EP | 1104907 | 6/2001 |

\* cited by examiner

*Primary Examiner*—Tho D. Ta
*Assistant Examiner*—L T
(74) *Attorney, Agent, or Firm*—Ladas & Parry (57) ABSTRACT

A connector for a memory card includes a tabular housing into which the memory card is inserted, contact terminals formed inside the housing so as to contact corresponding terminals of the memory card and connecting parts formed at respective end parts of the contact terminals and connectable to a conductive pattern of a circuit board. In the above-mentioned connector, each of the contact terminals is formed to extend to the top surface and the bottom surface of the housing.

6 Claims, 9 Drawing Sheets

CONNECTOR FOR MEMORY CARD

BACKGROUND OF THE INVENTION

1. Field of the Invention

The present invention relates to connectors for memory cards into which memory cards are inserted.

2. Description of the Related Art

A memory card incorporating a semiconductor memory (RAM) has been developed, for example, as a recording medium that records image data imaged by a digital camera, or as a recording medium that records music digital data reproduced by a portable music player.

In such kinds of memory cards, a package formed in a thin plate shape houses a semiconductor memory (RAM). At the same time, a plurality of terminals that are electrically connected to a connector for a memory card (referred to as "connector", hereinafter) are arranged at an end of the package.

In addition, each kind of the memory cards is formed in a predetermined size and shape. Accordingly, when attaching a connector to a digital camera or a portable music player, it is necessary to use the connector that corresponds to the size and shape of a memory card used.

Conventional connectors are formed in tabular (tablet-like) shapes so as to correspond to the shapes of memory cards. Additionally, a plurality of connector pins are arranged at an insertion part of the connector in which a memory card is inserted. Further, in the memory card, a plurality of terminals that contact the connector pins of the connector extend from either the top surface or under surface.

In the connector, end parts of the connector pins for contacting the terminals of the memory card extend outward from the back surface of the connector. The extending end parts are soldered onto a conductive pattern on a circuit board that is facing the bottom surface of the connector.

However, usually, the conventional connector is mounted on a circuit board such that the connector faces the top surface of the circuit board. Thus, each of the end parts of the connector pins is formed to extend from the back surface side to the bottom surface side of the connector so that the end part is soldered onto the conductive pattern on the circuit board. For this reason, in a case where the connector is mounted on the under (bottom) surface of the circuit board, it is necessary to manufacture a connector of a different specification of which end parts are formed to extend from the back surface side to the top surface side of the connector.

Thus, conventionally, it has been necessary to change the shape of the connector pins depending on whether the mounting surface of the circuit board is the upper surface or the under surface of the connector. Accordingly, there has been a problem in that the manufacturing cost becomes high since the production efficiency is deteriorated.

In addition, it is also conceived to mount the connector on the circuit board by reversing the upper surface and the bottom surface. However, in this case, the memory card must also be inserted in a reversed (inverted) way. Thus, a problem occurs that it is inconvenient for a user since the user tends to insert the memory card in a wrong way.

SUMMARY OF THE INVENTION

It is a general object of the present invention to provide an improved and useful connector for a memory card in which the above-mentioned problems are eliminated.

A more specific object of the present invention is to provide a connector for a memory card that can be mounted not only on the top surface of a circuit board but also on the under surface of the circuit board.

In order to achieve the above-mentioned objects, according to one aspect of the present invention, there is provided a connector for a memory card including a tabular housing into which a memory card is inserted, contact terminals formed inside the housing so as to contact corresponding terminals of the memory card and contact parts formed at respective end parts of the contact terminals and connectable to a conductive pattern of a circuit board, wherein: each of the contact terminals is formed to extend to the top surface side and the under surface side of the housing.

According to the above-mentioned aspect of the present invention, it is possible to mount the connector on a circuit board without reversing the connector whether the mounting surface of the circuit board is the top surface or the under surface. Therefore, it is unnecessary to prepare two kinds of connectors according to mounting positions on the circuit board. Thus, it is possible to reduce the manufacturing cost of the connector.

Furthermore, a memory card can be inserted into the connector in the same way whether the connector is mounted on the top surface or under surface of the circuit board. Accordingly, a user will not insert the memory card in the wrong way irrespective of the mounting position.

Other objects, features and advantages of the present invention will become more apparent from the following detailed description when read in conjunction with the following drawings.

DETAILED DESCRIPTION OF THE PREFERRED EMBODIMENTS

In the following, a detailed description will be given of an embodiment of the present invention, by referring to the accompanying drawings.

Figure 1A:
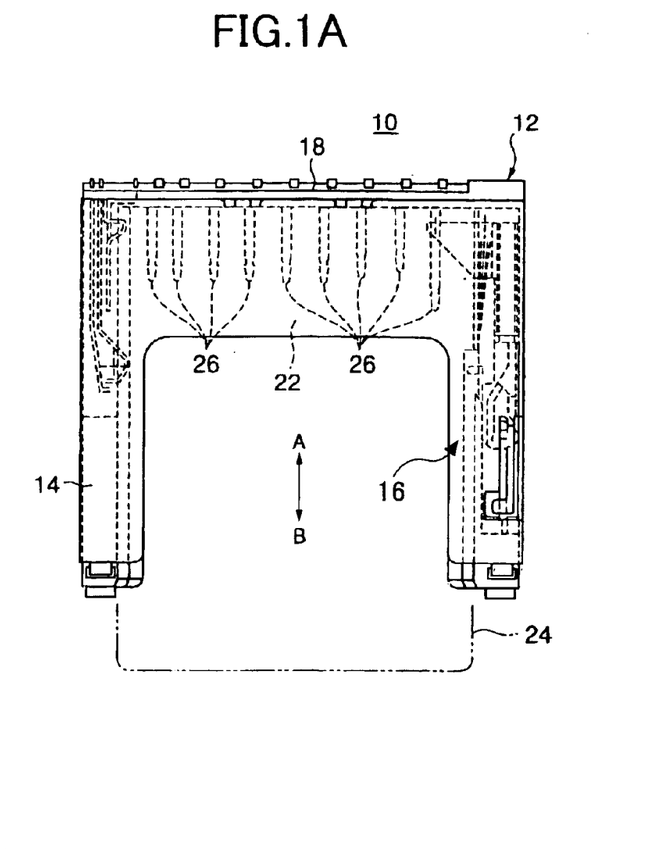
FIG. 1A is a plan view of a connector for a memory card to which an embodiment of the present invention is applied.
Figure 1B:
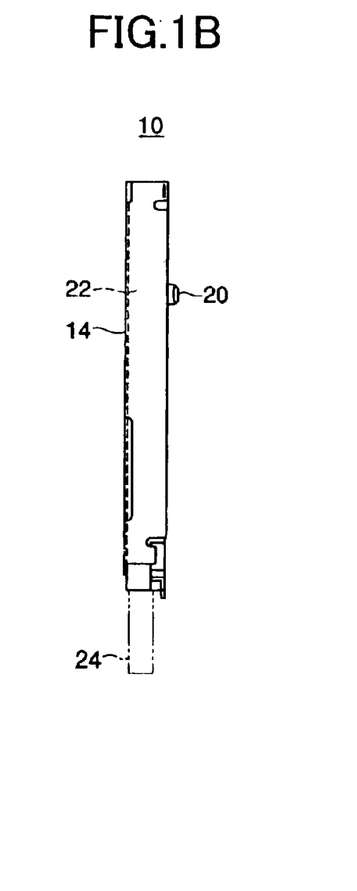
FIG. 1B is a side view of the connector.
Figure 1C:
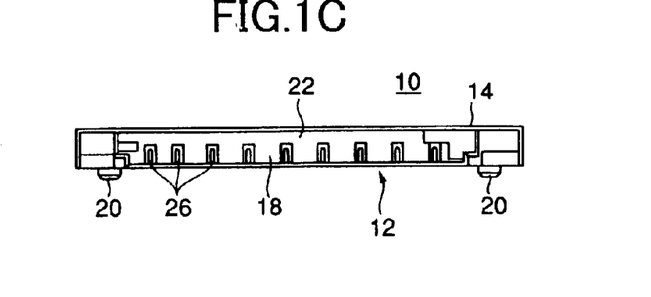
FIG. 1C is a front view of the connector.

FIGS. 1A, 1B and 1C are diagrams showing a connector 10 for a memory card to which the embodiment of the present invention is applied. FIG. 1A is a plan view, FIG. 1B is a side elevational view and FIG. 1C is a front view of the connector 10.

As shown in FIGS. 1A, 1B and 1C, the connector 10 includes a housing 12, a plate 14 for a shield, a lock mechanism 16 and a connector pin holding part 18. The plate 14 is attached to the housing 12 so as to cover the top surface and both sides of the housing 12. The lock mechanism 16 locks in place a memory card that is inserted. The connector pin holding part 18 is integrally formed with the housing 12. Further, the housing 12 and plate 14 are formed in reverse-U shapes as seen from above. Bosses 20 for positioning extend from the under surface of the housing 12.

In addition, the connector 10 includes a memory card insertion part 22 that is a space formed between the housing 12 and plate 14. The connector pin holding part 18 is arranged at the rear section of the housing 12 and is positioned in the back part of the memory card insertion part 22. Further, a plurality of connector pins (contact terminals) 26 are arranged and connected to the connector pin holding part 18. Each of the connector pins 26 contacts a corresponding terminal of a memory card 24.

Then, when the memory card 24 (indicated by a double-dotted chain line in FIG. 1A) is pushed in a direction indicated by an arrow A (direction A) and inserted in the memory card insertion part 22, the memory card 24 is locked in place by the lock mechanism 16 while being electrically connected to the connector pins 26 of the connector pin holding part 18.

In this state, data are written to or read from the memory card 24 in the connector 10. Additionally, when removing the memory card 24 from the connector 10, the memory card 24 is ejected in a direction indicated by an arrow B (direction B) by pushing the memory card 24 again and further in the direction A so as to release the locking action of the lock mechanism 16.

Figure 2:
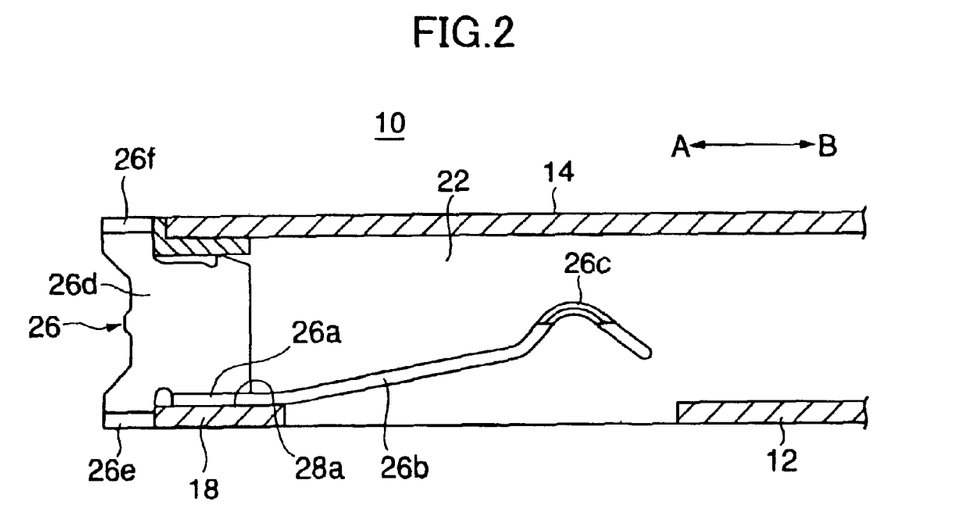
FIG. 2 is a longitudinal cross-sectional view showing a state where a connector pin is attached to a housing.
Figure 3A:
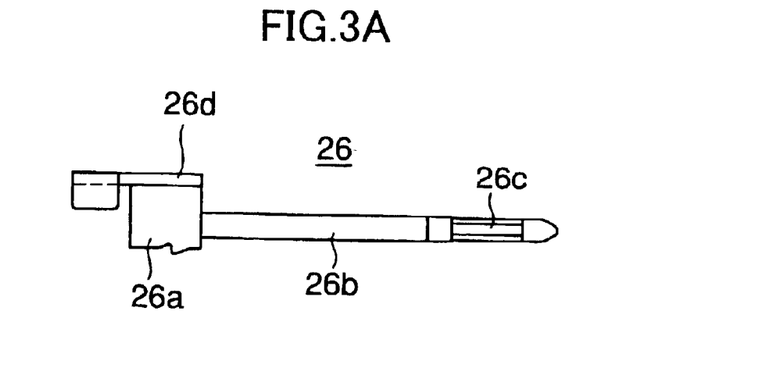
FIG. 3A is a plan view of the connector pin.
Figure 3B:
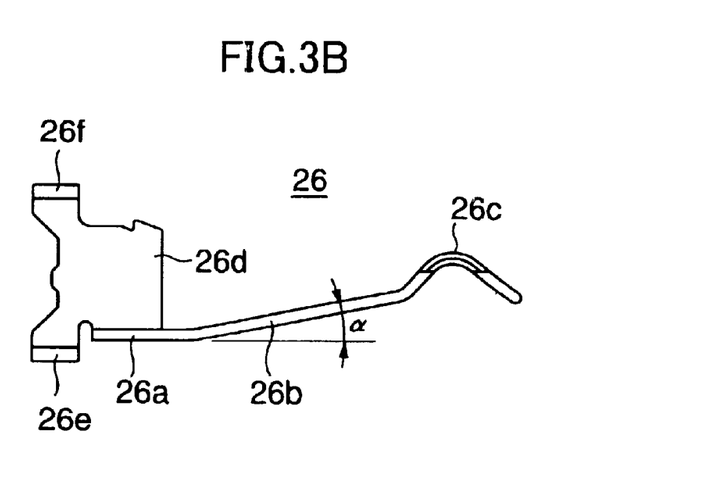
FIG. 3B is a side view of the connector pin.
Figure 3C:
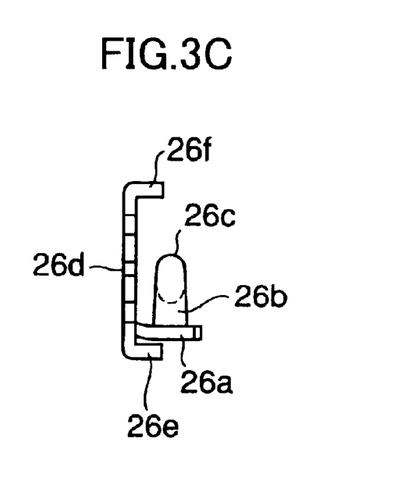
FIG. 3C is a back view of the connector pin.

FIG. 2 is a longitudinal cross-sectional view showing a state where the connector pin 26 is attached to the housing 12. FIGS. 3A, 3B and 3C are diagrams showing the structure of the connector pin 26. FIG. 3A is a plan view, FIG. 3B is a side elevational view and FIG. 3C is a back view of the connector pin 26.

As shown in FIGS. 2, 3A, 3B and 3C, the connector pin 26 includes a fitting part 26a, an arm part 26b, a contact part 26c, a connecting part 26d, a first terminal 26e and a second terminal 26f. The fitting part 26a fits an insertion hole 28a provided to the connector pin holding part 18 of the housing 12 and extends horizontally. The arm part 26b extends from the fitting part 26a toward the memory card insertion hole 22. The contact part 26c is bent so as to form an open U-shape at the end of the arm part 26b. The connecting part 26d extends from the fitting part 26a toward the back surface side of the connector pin holding part 18 and is held by the connector pin holding part 18 so as to extend upward in the vertical direction. The first terminal 26e is provided to the bottom of the connecting part 26d. The second terminal 26f is provided to the top of the connecting part 26d.

The arm part 26b is formed to incline at degrees with respect to the fitting part 26a. When the memory card 24 is inserted in the memory card insertion 10, hole 22, the arm part 26b is bent downward so that the contact part 26c contacts a corresponding terminal of the memory card 24. At the same time, the arm part 26b presses the contact part 26c against the terminal of the memory card 24 by spring action so as to maintain the contact pressure.

Further, the contacting part 26d is formed in a horseshoe shape as viewed from the back surface in FIG. 3C. In addition, the first terminal 26e and the second terminal 26f are bent in the horizontal direction so that the first terminal 26e is in the plane of and extends the same flat surface as the under surface of the connector 10, and the second terminal 26f is in the plane of and extends the same flat surface as the top surface of the connector 10. In other words, the first terminal 26e and the second terminal 26f extend toward the back surface side of the connector 10, however, not upward and downward, respectively. That is, the first terminal 26e and the second terminal 26f are formed so as to correspond to a thinner connector 10.

Figure 4A:
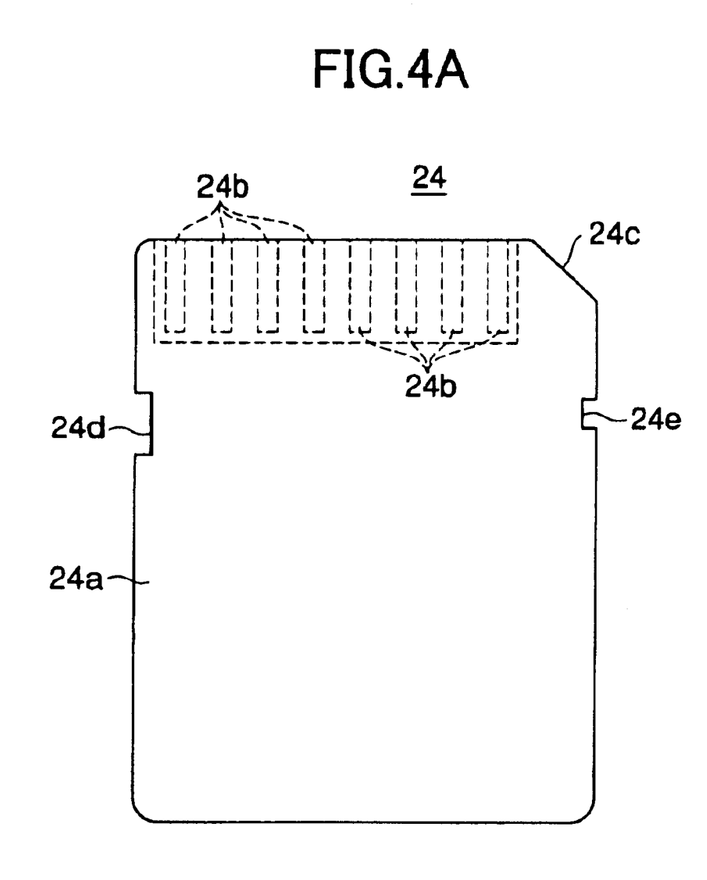
FIG. 4A is a plan view of a memory card.
Figure 4B:
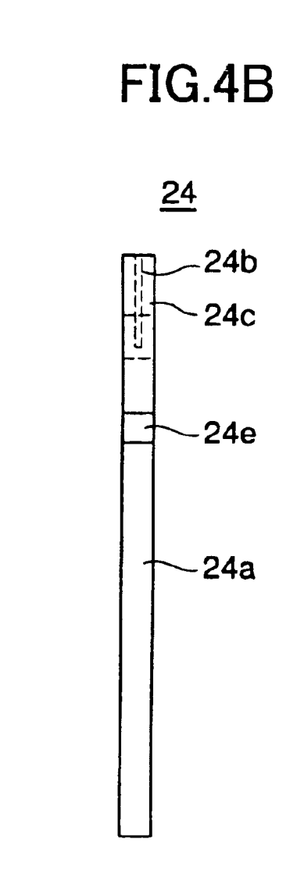
FIG. 4B is a right side view of the memory card 24.

FIGS. 4A and 4B are diagrams showing the structure of the memory card 24. FIG. 4A is a plan view of the memory card 24, and FIG. 4B is a right side elevational view of the memory card 24.

As shown in FIGS. 4A and 4B, in the memory card 24, a semiconductor memory (not shown) is housed inside a laminated case 24a, and a plurality of terminals 24b are attached to the end of the inserting side of the case 24a. The plurality of terminals 24b are arranged at intervals corresponding to the intervals at which the connector pins 26 are arranged. At the same time, the terminals 24b are provided so as to be exposed only on the under surface side. Accordingly, when inserting the memory card 24 in the connector 10, the memory card 24 must be inserted with the terminals 24b facing down, exposed only on the under surface side.

In addition, a sloping part 24c for detecting the inserting direction is provided to the front right side of the case 24a. Concave parts 24d and 24e for locking are provided to the left side and right side of the case 24a, respectively.

Here, a description will be given of a state where the connector 10 that is structured as described above is attached to a circuit board.

Figure 5:
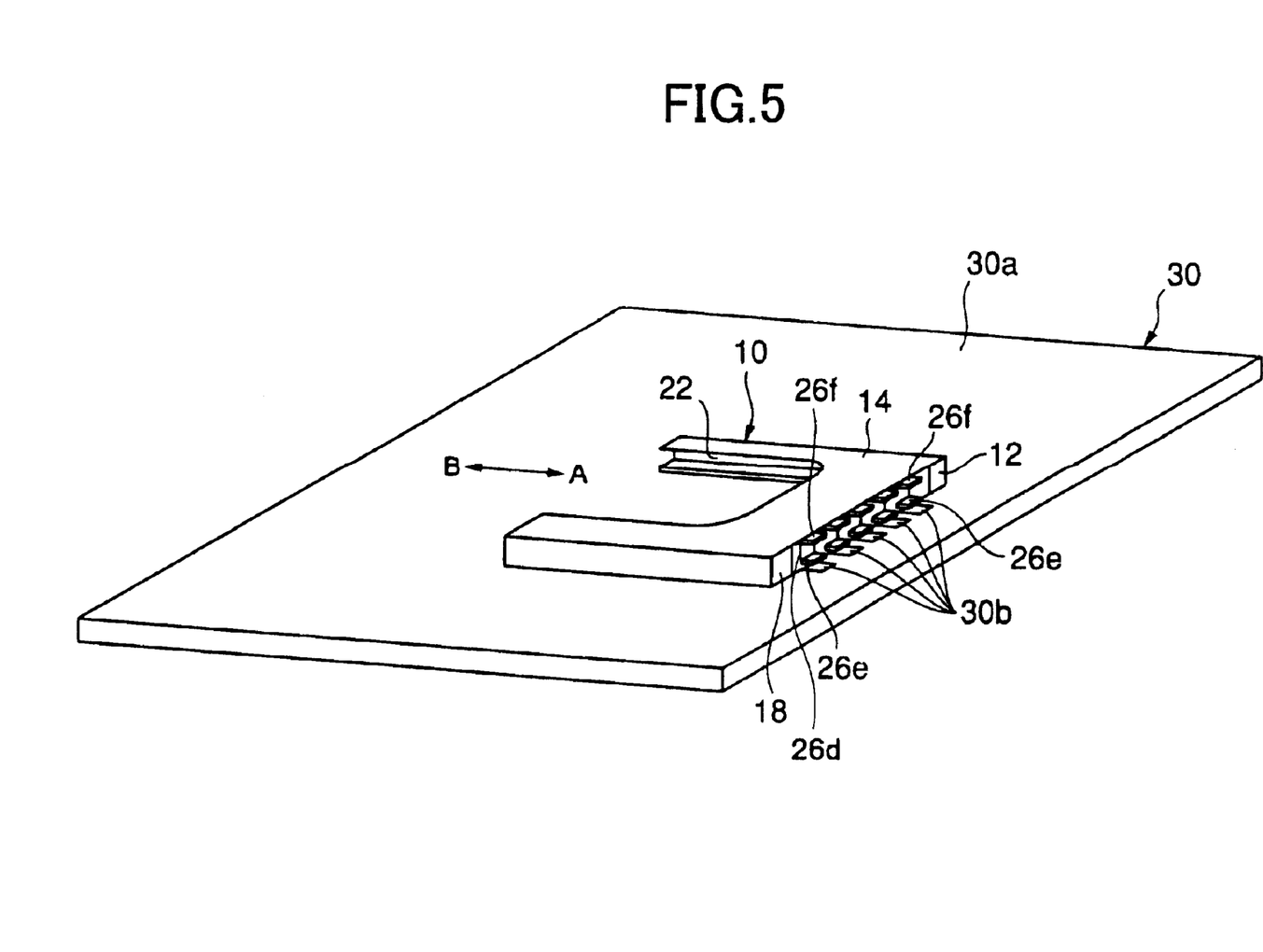
FIG. 5 is a perspective view showing a state where the connector is mounted on a top surface of a circuit board.
Figure 6:
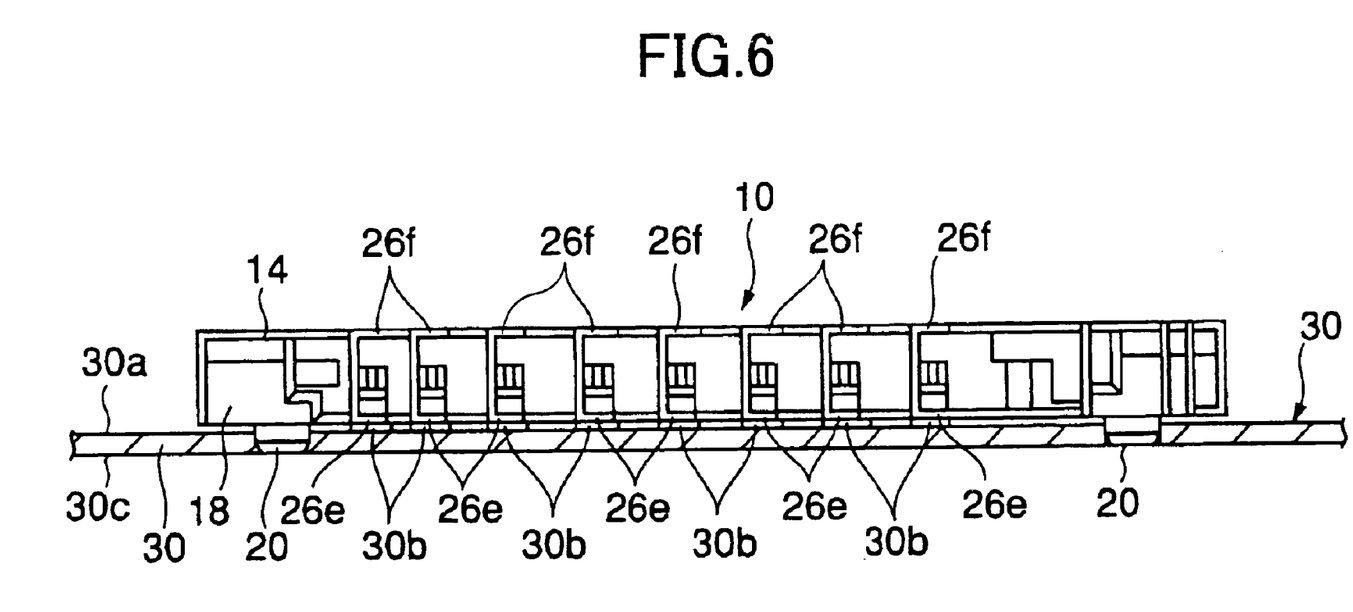
FIG. 6 is a back view showing the state where the connector is mounted on the top surface of the circuit board.

FIG. 5 is a perspective view showing a state where the connector 10 is mounted on a top surface 30a of a circuit board 30. FIG. 6 is a back view showing the state where the connector 10 is mounted on the top surface 30a of the circuit board 30.

As shown in FIGS. 5 and 6, the connector 10 is soldered onto a conductive pattern 30b formed on the top surface 30a in a state where the connector 10 is mounted on the top surface 30a of the circuit board 30. In this case, among pairs of the terminals 26e and 26f extending toward the back surface side of the connector 10, the first terminals 26e located in the lower side of the connector pins 26 are soldered onto the conductive pattern 30b formed on the top surface 30a.

Figure 7:
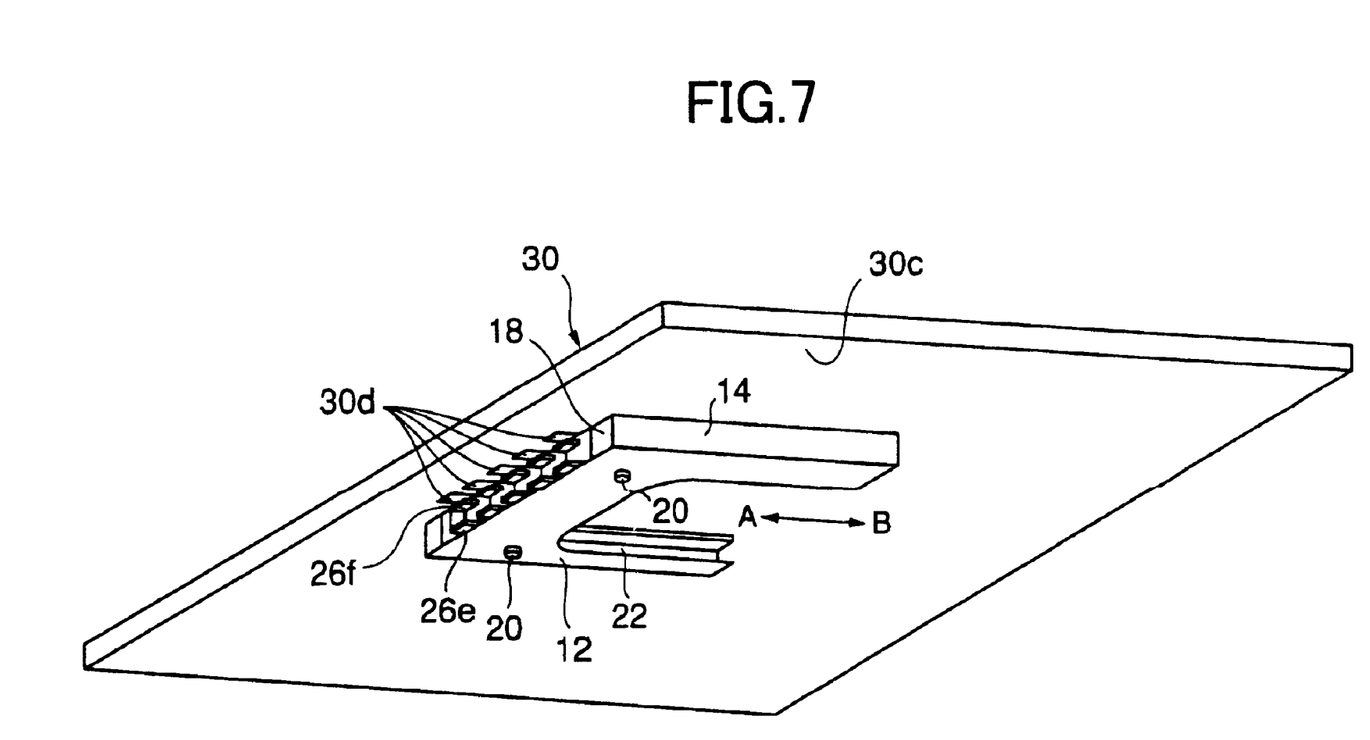
FIG. 7 is a perspective view showing a state where the connector is mounted on an under surface of a circuit board.
Figure 8:
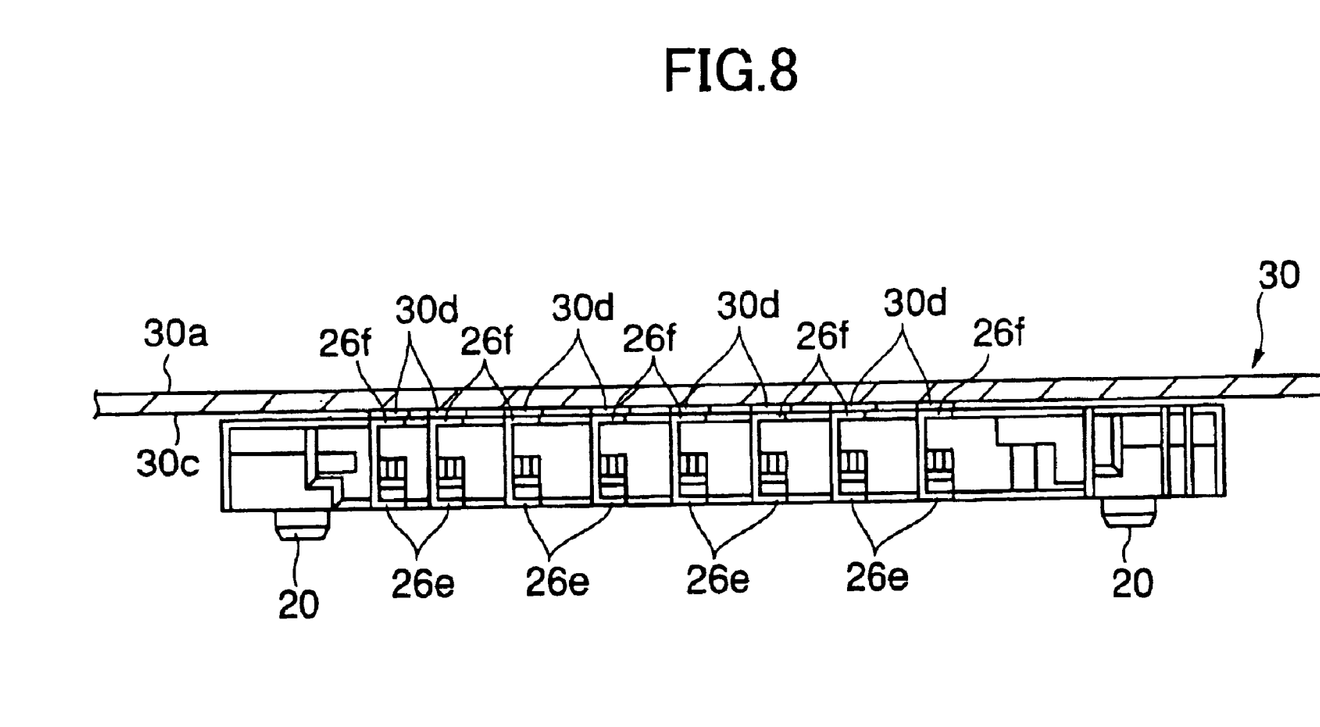
FIG. 8 is a back view showing the state where the connector is mounted on the under surface of the circuit board.

FIG. 7 is a perspective view showing a state where the connector 10 is mounted on an under surface 30c of the circuit board 30. FIG. 8 is a back view showing the state where the connector 10 is mounted on the under surface 30c of the circuit board 30.

As shown in FIGS. 7 and 8, the connector 10 is soldered onto a conductive pattern 30d formed on the under surface 30c in the state where the connector 10 is mounted on the under surface 30c of the circuit board 30. In this case, among pairs of the terminals 26e and 26f that are extending toward the back surface side of the connector 10, the second terminals 26f located in the upper side of the connector pins 26 are soldered onto the conductive pattern 30d formed on the under surface 30c.

Further, it should be noted that when mounting the connector 10 on the under surface 30c of the circuit board 30, a spacer (not shown) made of an insulating material is provided between the plate 14 and the under surface 30c so that the plate 14 does not contact the conductive pattern 30d on the under surface 30c.

Figure 9:
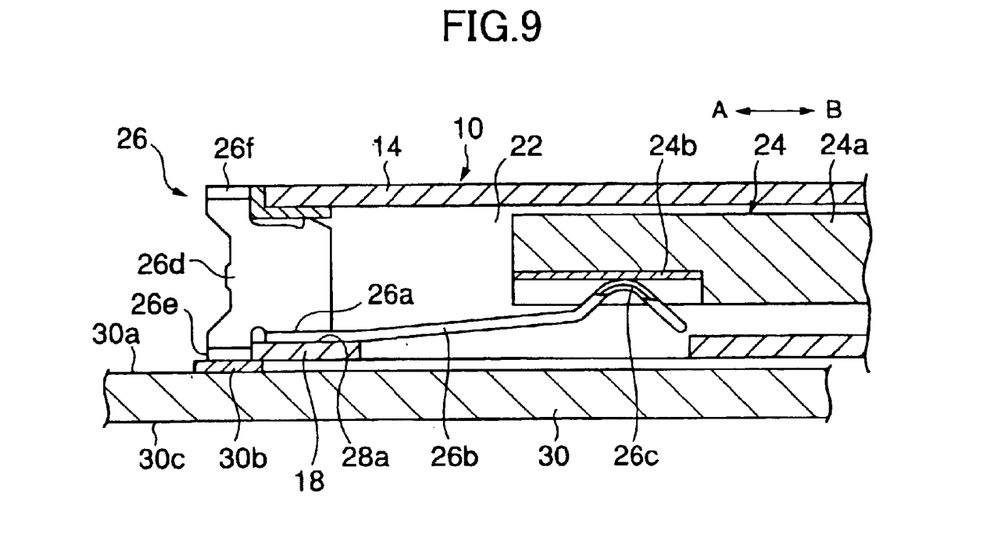
FIG. 9 is a longitudinal cross-sectional view showing a state where the memory card is inserted in the connector mounted on a top surface of a circuit board.

FIG. 9 is a longitudinal sectional view showing a state where the memory card 24 is inserted in the connector 10 that is mounted on the top surface 30a of the circuit board 30.

As shown in FIG. 9, when using the connector 10 soldered onto the top surface 30a of the circuit board 30, the memory card 24 is inserted in the memory card insertion part 22 with the terminals 24b on the under surface side. Hereby, the memory card 24 is held by and electrically connected to the connector 10 such that the terminals 24b contact the contact parts 26c of the connector pins 26.

Figure 10:
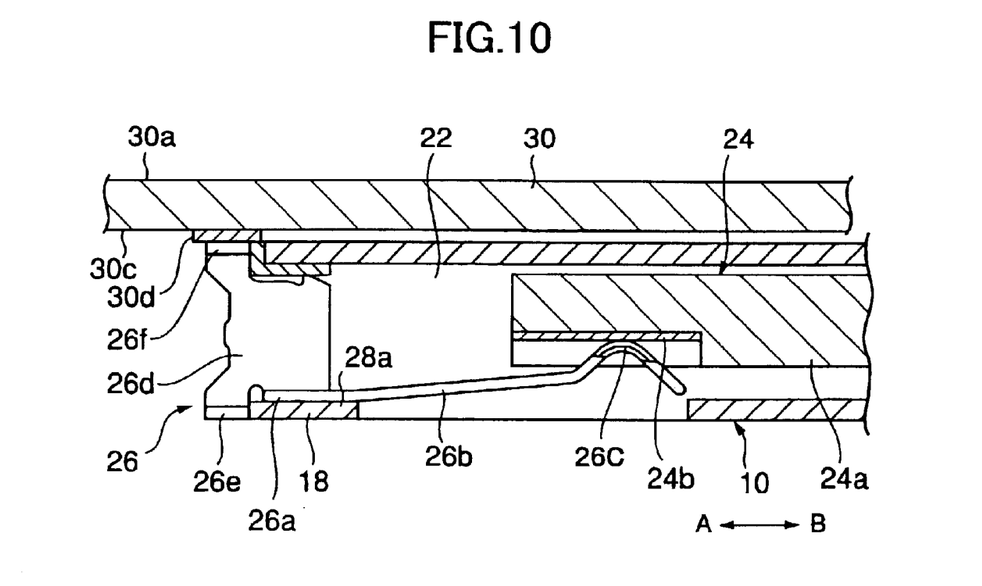
FIG. 10 is a longitudinal cross-sectional view showing a state where the memory card is inserted in the connector mounted on an under surface of a circuit board.

FIG. 10 is a longitudinal cross-sectional view showing a state where the memory card 24 is inserted in the connector 10 that is mounted on the under surface 30c of the circuit board 30.

As shown in FIG. 10, when using the connector 10 soldered onto the under surface 30c of the circuit board 30, the same as the case shown in FIG. 9, the memory card 24 is inserted in the memory card insertion part 22 with the terminals 24b on the under surface side. Hereby, the memory card 24 is held by and electrically connected to the connector 10 such that the terminals 24 contact the contact parts 26c of the connector pins 26.

As described above, the connector 10 can be mounted on either the top surface 30a or the under surface 30c of the circuit board 30 without being reversed. Thus, it is unnecessary to separately manufacture connectors to be mounted on the top surface of a circuit board and connectors to be mounted on the under surface of a circuit board as in the conventional way. Therefore, it is possible to increase the production efficiency so as to reduce the manufacturing cost.

Furthermore, the memory card 24 can be inserted in the connector 10 in the same way whether the connector 10 is mounted on the top surface 30a or the under surface 30c. Thus, when the connector 10 is used, a user will not insert the memory card 24 in the wrong way irrespective of the mounting position. As just described, the connector 10 has a user-friendly structure.

In addition, in the above-described embodiment, the description is given by taking the memory card 24 having the shape as shown in FIG. 4 as an example. However, of course, the present invention can be applied to not only such memory cards but also memory cards having other shapes.

Further, in the above-described embodiment, the description is given by taking the connector pins 26 having the shapes as shown in FIG. 3 as an example. However, of course, the connector pins 26 may have other shapes as long as the connecting parts 26d of the connector pins 26 are formed to extend toward the top surface side and the under surface side.

The present invention is not limited to the specifically disclosed embodiments, and variations and modifications may be made without departing from the scope of the present invention.

The present invention is based on Japanese priority application No. 2001-263545 filed on Aug. 31, 2001, the entire contents of which are hereby incorporated by reference.

What is claimed is:

1. A connector for a memory card, comprising:
   a housing into which the memory card is inserted;
   contact terminals formed inside said housing so as to contact corresponding terminals of said memory card; and
   connecting parts formed at respective end parts of said contact terminals and connectable to a conductive pattern of a circuit board,
   wherein each of said connecting parts is formed to extend to a top surface side and an under surface side of the housing, and
   further wherein each of the connecting parts comprises:
      an intermediate part;
      a first terminal formed to extend toward the top surface side of the housing, wherein the first terminal is bent substantially perpendicular to the top of the intermediate part;
      a second terminal formed to extend toward the under surface side of the housing, wherein the second terminal is bent substantially perpendicular to the bottom of the intermediate part; and
      the intermediate part connecting said first terminal and said second terminal.

2. The connector as claimed in claim 1, wherein the first terminal is configured and arranged to be electrically connected to the conductive pattern formed on the under surface of the circuit board when attached to said under surface.

3. The connector as claimed in claim 1, wherein the second terminal is configured and arranged to be electrically connected to the conductive pattern formed on the top surface of the circuit board when attached to said top surface.

4. The connector as claimed in claim 1, wherein:
   the first terminal extends toward a back surface side of the housing and is parallel with the top surface of the housing; and
   the second terminal extends toward said back surface side and is parallel with the under surface of the housing.

5. The connector as claimed in claim 1, wherein a plurality of the contact terminals are arranged so as to correspond to the number of the terminals of the memory card.

6. The connector as claimed in claim 1, further comprising:
   a lock mechanism that locks in place the memory card inserted into the housing and releases the locking in place when the memory card is pushed further and past the locked position.

* * * * *